3,509,593
APPARATUS FOR CLEANING ANIMAL INTESTINES
Leonard De Moss, Des Moines, Iowa, assignor to Strickler-De Moss Mfg. Co., Des Moines, Iowa, a partnership composed of Richard A. Strickler and Leonard De Moss, both of Des Moines, Iowa
Filed Oct. 10, 1967, Ser. No. 674,214
Int. Cl. A22c 17/16
U.S. Cl. 17—43                                         3 Claims

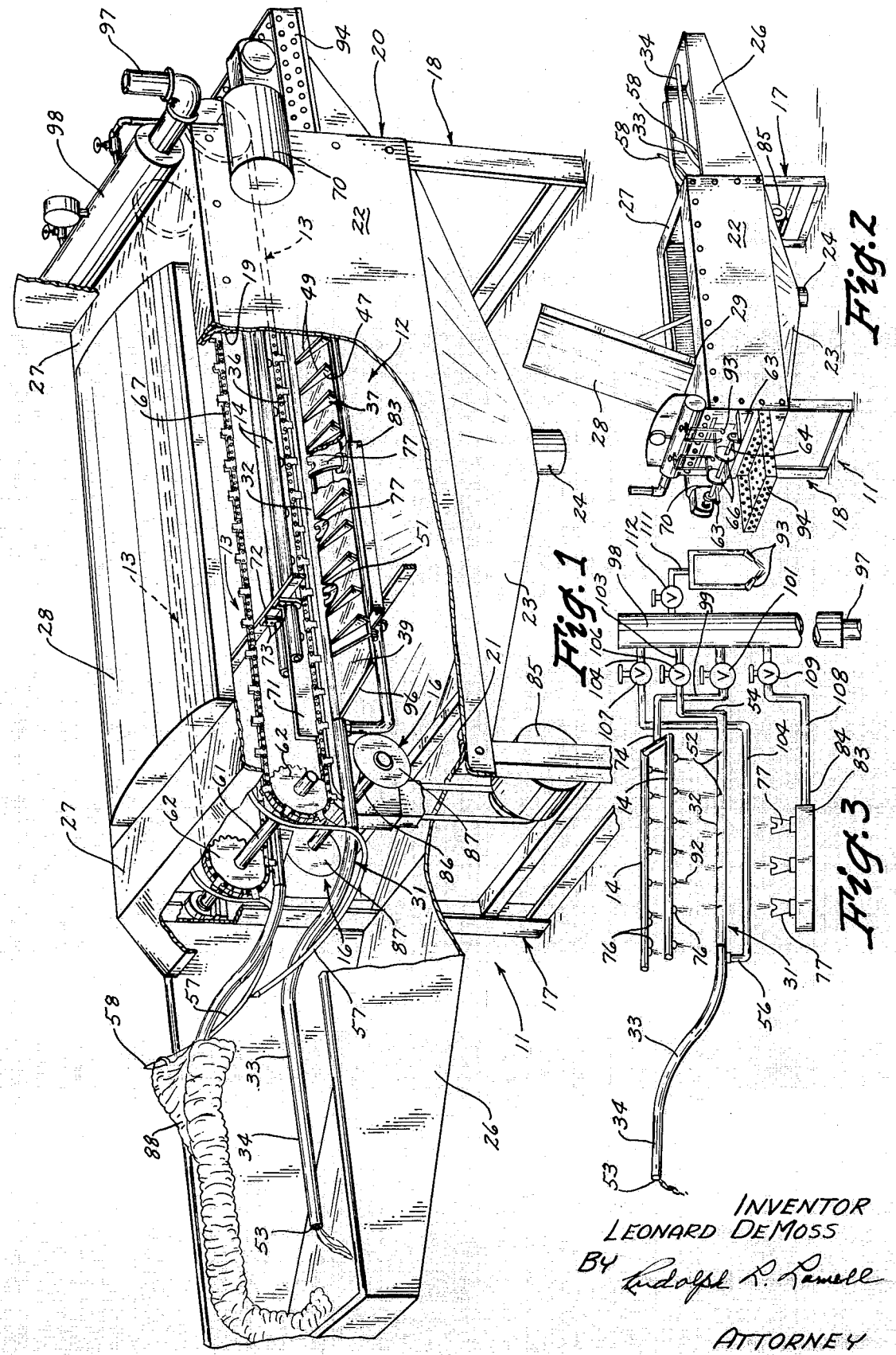

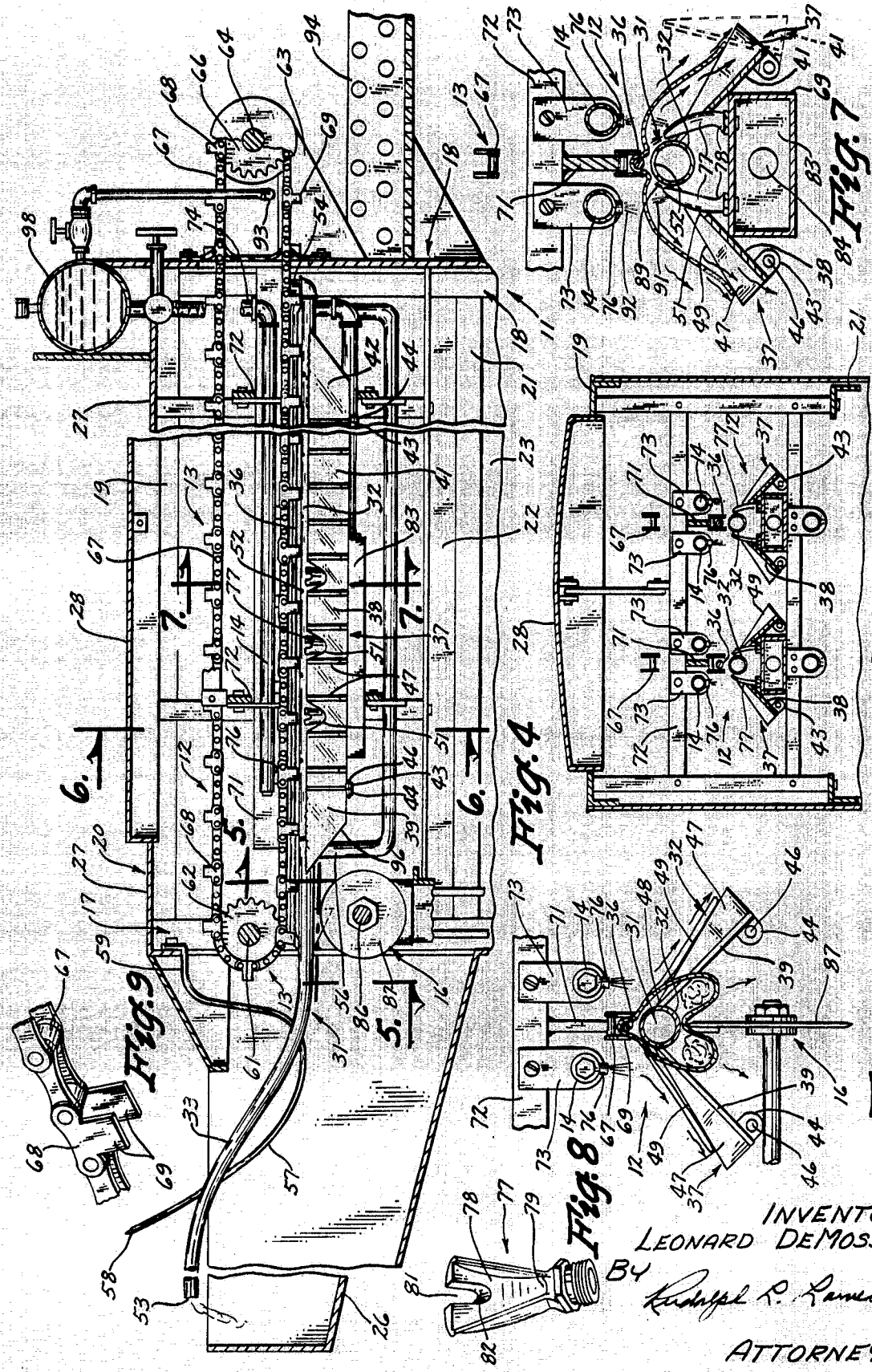

ABSTRACT OF THE DISCLOSURE

An animal intestine cleaning machine provides for the initial travel of the intestine on a fluid carrying pipe wth its fatty upper side guided for support on the top surface of the pipe. The lower side of the intestine is cut longitudinally and the slit intestine is spread out while supported on the fluid carrying pipe. On commencement of the washing operation, the fatty side is moved to a supported position on a small diameter rod spaced above and parallel to the fluid carrying pipe so that water discharged upwardly from the pipe and from nozzles arranged at opposite sides of the pipe act to wash all portions of the under surface of the spread out intestine.

SUMMARY OF THE INVENTION

The machine of this invention provides for the efficient cleaning of animal intestines by continuously supporting the fatty side of an intestine in an uppermost position during the intestine slitting and washing operations. Offal is thus continuously directed away from the fatty side of the intestine. After the intestine has been slit the intestine is spread out with the inner surface of the fatty side moved to a supported position on a small diameter rod located above a series of upwardly directed water jets, and below a series of downwardly directed water jets. All portions of opposite surfaces of the spread out intestine are thus directly subjected to the washing action of the discharge jets. By using cold water in the washing operation the fatty cells are maintained firm to facilitate the removal of all offal particles.

DESCRIPTION OF THE INVENTION

Further objects, features and advantages of the invention will become apparent from the following description when taken in connection with the accompanying drawing wherein:

FIG. 1 is a side perspective view of the intestine cleaning machine of this invention, with certain parts broken away for the purpose of clarity;

FIG. 2 is a reduced perspective view of the intestine cleaning machine of this invention as seen from the side opposite the side shown in FIG. 1;

FIG. 3 is a diagrammatic showing of the water system for the machine shown in FIG. 1;

FIG. 4 is an enlarged foreshortened longitudinal sectional view through the machine shown in FIG. 1;

FIG. 5 is an enlarged sectional view taken along the line 5—5 in FIG. 4;

FIG. 6 is a sectional view as seen on the line 6—6 in FIG. 4;

FIG. 7 is an enlarged sectional view on the line 7—7 in FIG. 4;

FIG. 8 is a perspective view of a spray nozzle which forms part of the washer system in the machine of this invention; and FIG. 9 is a detail perspective view of an intestine engaging drive chain.

With reference to the drawing the intestine or chitterling cleaning machine of this invention is shown in FIG. 1 as including a main frame structure, designated generally as 11, and a pair of transversely spaced intestine supporting and washing units 12 that are extended longitudinally of the frame 11. Each unit 12 includes an endless conveyor assembly 13 for moving an intestine, tubular spray members 14 for washing the top surface of an intestine as it is moved by a conveyor assembly 13, and a rotary cutter unit 16 for longitudinally slitting the under surface of an intestine prior to any washing action thereon.

The frame 11 is comprised of a pair of longitudinally spaced upright end structures 17 and 18 (FIGS. 1 and 4) connected together by upper side members 19 and lower side members 21. For the convenience of description the end structure 17 will be referred to as the front end structure of the machine.

A housing assembly 20 includes side panels 22 connected to opposite sides of the end frame structures 17 and 18 and between the side members 19 and 21. Secured to the side members 19 and 21 and end structures 17 and 18 (FIGS. 1 and 2) for connection with the lower ends of the side panels 22 is a sump or bottom wall 23 having a drain 24. A trough or intestine receiving member 26 is extended forwardly from the front end structure 17 to form an extension of the housing 20. A top wall 27 carried on the end structures 17 and 18 between the side panels 22 has a longitudinally extended cover member 28 hinged at one end 29.

Since the pair of intestine supporting and washing units 12 are similar in construction and operation only one of such units will be described in detail, with like numerals being applied to corresponding parts.

An intestine supporting and washing unit 12 (FIG. 4) includes a pipe or fluid carrying member 31 extended longitudinally of and within the housing 20. The pipe member 31 has a wash section 32 extended between the frame end structures 17 and 18, and a front or intestine feed section 33 that projects upwardly and forwardly within the trough member 26 with its front portion 34 extended substantially horizontally and terminating adjacent the closed or front end of the trough member 26. A rod member 36 (FIGS. 4 and 5) of a greatly reduced diameter relative to the fluid carrying member 31 and coextensive in length with the wash section 32 has downturned ends secured to the wash section 32, as by welding, for support in a parallel spaced relation above the wash section 32 for a purpose to appear later.

Positioned adjacent to and at opposite sides of the wash section 32 (FIGS. 6 and 7) are a pair of combination support and spreader assemblies 37 which extend laterally downwardly in opposite directions from the wash section. Each combination assembly 37 (FIG. 4) includes a flat base plate 38 having a front section 39, an intermedite section 41, and a rear section 42. The front and rear base plate sections 39 and 42, respectively, (FIGS. 1 and 4) are fixed with their inner edges secured to the wash section 32 of the pipe member 31.

The intermediate base plate section 41, at each end of its outer edge, is formed with a lug or ear 43 (FIGS. 5 and 7) that has an adjacent associated ear 44 on each of the base plate sections 39 and 42. Pivot pins 46 extended through each adjacent pair of ears 43 and 44 pivotally support the intermediate base plate section 41 for pivotal movement from a position within a plane common to the fixed front and rear base plate sections 39 and 42, shown in FIG. 6, to an upright position, shown in dotted lines in FIG. 7, spaced to one side of the wash section 32 of the pipe member 31.

As best appears in FIGS. 4 and 5 each of the intermediate and rear base plate sections 39 and 42, respectively, of a spreader assembly 37 is provided with a series of longitudinally spaced upright vanes or dividers 47. Each vane 47 is of a right triangular shape in side elevation with the apex end 84 adjacent the pipe member 31 and the hypotenuse or upper edge 49 thereof inclined outwardly and downwardly in a diverging relation with the flat base plate member 38. The inner portion of the intermediate or hinged section 41, (FIGS. 4 and 7) has portions cut away to form notches 51 between certain ones of the vane members 47 for a purpose to appear later.

The pipe 31 (FIGS. 3 and 7) over the length of the wash section 32 is formed in its upper wall with a plurality of transverse discharge orifices 52 which are spaced longitudinally of the section 32 to direct fluid in directions generally upwardly and laterally therefrom from the section 32. A single discharge orifice 53 is provided in the terminal end of the feed section 33 of the pipe 31. In order to maintain a full and uniform flow of fluid from the discharge orifices 52 and 53 the pipe 31 has a pair of separate inlet connections 54 and 56 (FIG. 3).

The feed section 33 of the pipe member 31 has operatively associated therewith a fat hook guide 57 that is formed wih an upwardly facing hook section 58 and a shank section 59. The hook guide 57 lies in a vertical plane adjacent to the feed section 33 with the shank section 59 secured to the front end of frame structure 17 so that the hook section 58 is freely suspended with its forward end located above the feed section 33. It is seen therefore that the feed section 33 and the fat hook guide 57 extend longitudinally of and within the trough or chitterling receiving section 26.

Suitably supported for rotation on the front end frame structure 17 is a front transverse shaft 61 which carries a pair of sprockets 62 (FIGS. 1 and 4). Projected rearwardly from the rear end frame structure 18 is a pair of mounting arms 63 (FIG. 2) for rotatably supporting a rear transverse shaft 64 that carries a pair of sprockets 66 corresponding to the sprocket 62. Trained about each pair of corresponding sprockets 62 and 66 for movement longitudinally of the frame 11 is an endless sprocket chain 67 of a usual roller and link construction. The chains 67 are operated by an electric motor 70 carried on the rear end frame structure 18 in a driving relation with the shaft 64.

As best appears in FIGS. 4 and 9 certain of the links 68 of the sprocket chain 67 are integrally formed with transversely opposite outwardly projected fingers 69 which are arranged in a straddling relation (FIG. 5) with the rod 36 on the wash section 32 of the fluid carrying pipe 9. To maintain the travel of the lower flight of a chain 67 in a straight line adjacent to a pipe 31, namely, travel without slack or lateral movement, a track member 71 comprising an elongated bar, is positioned above the lower flight of a chain 67 and between a corresponding pair of sprockets 62 and 66 for riding engagement on the chain rollers at a position between the roller connecting links. The track members 71 are supported on the frame structure 11 by transverse brace or connecting members 72 (FIG. 6), which are connected between the frame side members 19 and 21.

Positioned at opposite sides of a track member 71 is a pair of the tubular fluid discharge or spray members 14 which are suspended by brackets 73 from the transverse members 72 (FIG. 6). Each pair of the tubular spray members 14 (FIG. 3) has a common inlet connection 74 for supplying water under pressure to downwardly directed orifices 76 spaced longitudinally in the bottom sides thereof. Projected upwardly through the openings or notches 51 in the intermediate base plate section 41 are spray nozzles 77. As shown in FIG. 7 the nozzles 77 are arranged in pairs to opposite sides of a fluid carrying member 31.

A nozzle 77 (FIG. 8) has a water deflecting shroud 78 of a substantially triangular shape in side elevation and of a concavo-convex shape in longitudinal section, with the concave surface thereof being adjacent to a water discharge opening 79 so that water discharged from the opening 79 is distributed in a fan shaped stream by the shroud. The outer end of the shroud 78, at a position opposite the discharge opening 79, is formed with a slot 81 having an end wall 82 that is tapered in a direction toward the discharge opening 79. Water under pressure is supplied to the nozzles 77 of each washing unit 12, through a common header 83 having a single inlet connection 84 (FIGS. 3 and 7).

Arranged below the front transverse shaft 61 and carried on the front end frame structure 17 is the cutting unit 16 which includes a shaft 86 that carries a pair of rotary cutting blades 87. As shown in FIG. 5 each blade 87 is positioned in a vertical plane which is common to a corresponding chain 67 and fluid carrying pipe 31. The upper edge of a rotary blade 87 is located adjacent to the underside of the forward end of the wash section 32 of the pipe 31. The blades 87 are driven by an electric motor 85 mounted on the front end frame structure 17.

In use the machine is adapted to clean intestines of varying sizes and in one embodiment of the invention the pipe 31 has a diameter of about one and one-half inches and will effectively carry intestines having diameters, when filled, of from four to six inches, namely, the large colon or intestine of a hog. The intestine 88 to be cleaned (FIG. 1) is carried in the trough 26 with the lead end thereof initially positioned on the feed portion 33 of the fluid carrying pipe 31. With the lead end of the intestine 88 supported on the feed section 33, the fatty side of the intestine is moved to an upper position and the guide hook 58 is pierced or projected therethrough.

Water discharged from the orifice 53 at the front end of the feed section 33 immediately effects a flushing action on the offal within the intestine 88 so that a portion of the offal is removed from the intestine for dropping into the trough 26 concurrently with the manual moving of the intestine on the feed section 33 and guide hook 57 in a direction toward the front frame structure 17. By virtue of the guide hook 57 acting to hold the fatty side of the intestine in an uppermost position, the fatty side is retained out of contact with the removed offal. The flushing action effected by the water discharged from the orifice 53 is complemented by what might be termed a loosening of the offal within the intestine. In other words, appreciable offal remains in the intestine as it approaches the rotary cutting unit 16.

As the intestine approaches a rotary knife 87 the lead end thereof is picked up by the chain 67 of a conveyor assembly 13 whereby the intestine 88 is torn free of the fat hook guide 57 with the fatty side thereof supported on the rod 36. The bottom side of the intestine is then moved against the rotary blade 87, by the action of the engaging fingers 69 on a chain 67, and the intestine is continuously slit longitudinally thereof along its bottom side, namely, the side opposite the fatty side thereof. On being cut or slit, the contents remaining within the intestine drop downwardly out of the intestine and into the tank or sump 23.

Concurrently with being engaged by the cutter 87 the top side of the intestine passes between the rod 36 and the feeding chain 67 with the pickup fingers 69 acting to automatically feed the intestine through the machine. In this feeding action the intestine 88, as appears in FIG. 5, is moved to what might be termed a full spread position wherein the intestine is supported at its central portion on the rod 36 and at its side portions on the upper edges of the vanes 47.

As the leading end of the intestine 88 passes over the intermediate base plate sections 41 of the baffle plate assembly 37 the under or lower surface of the spread out intestine is concurrently acted upon by the jets of fluid discharged from the orifices 52 of the pipe 31 and from the spray nozzles 77. The shroud 78 (FIG. 7) of a nozzle 77 directs streams of water in two directions, with a first stream 89 being directed about the upper peripheral portion of the pipe 31 for intermixing with the spray from the orifices 52 in a zone immediately below the supporting rod 36. This intermixing of the water from the nozzles 77 and orifices 52 effectively removes all offal particles from the under surface of the central portion of the intestine.

By virtue of the slot 81 in a shroud 78 a second stream of water 91 discharged from the nozzles 77 is directed upwardly against the lower surface of the intestine at positions substantially opposite the downwardly directed streams 92 of water from the orifices 76 in the spray members 14. This counter action of the streams 91 and 92 function to hold the intestine side portions in partially suspended positions above the vanes 47 so as to eliminate pockets or depressions being formed in the intestine between adjacent vanes. The opposite side surfaces of the intestine are thus continuously and effectively flushed to remove all offal particles therefrom. As the intestine 88 passes out of the zone of action of the spray nozzles 77 the under surface thereof is continuously acted upon and cleaned by the upwardly and laterally directed jets of fluid discharged from the orifices 52.

In this connection it is to be noted that the vane members 47 function not only to support the intestine in its spread out position but their upper edges 49 tend to scrape those portions of the underside of the intestine 88 coming in contact therewith. As a result of this scraping engagement the intestine 88 tends to be successively engaged and released by the vanes 47 to produce a flexing of the intestine concurrently with its movement longitudinally of the pipe 31. This flexing action functions to break away small particles of offal from the under surface of the intestine concurrently with changing the angle of the surface portions that are acted upon by the jets from the orifices 52.

Simultaneously with the washing action on the lower surface of the intestine 88 by the water discharge from the pipe 31, the top surface of the intestine is subjected to the washing and cleaning action of the jets 92 directed downwardly from the sprays 14 through the discharge openings 76 therein which wash over the complete top surface of the intestine.

As the intestine 88 passes off the rear end of the supporting rod 36 (FIG. 1) it tends to remain engaged by the pickup fingers 69 for travel with the lower length of the chain 67 to a position rearwardly of the frame end structure 18 andtoward a sprocket 64. Carried on the end frame structure 18 and spaced rearwardly therefrom for arrangement at opposite sides of the lower lentgh of the chain 67 is a pair of nozzles 93. The sprays from the nozzles 93 are directed downwardly with sufficient pressure and velocity to disengage the intestine from the pickup fingers 69. Along with effecting the release of the intestine from the fingers these sprays serve further to give a final washing or cleansing action to the top surface of the intenstine. On disengagement from the pickup fingers 69 the cleaned intenstine drops into a perforated receiving tray 94 extended rearwardly from the rear frame structure 18.

It is thus seen that the intestine 88 is initially positioned on the forward end of the feed section 33 of the pipe member 31 and then arranged with its fatty side uppermost by the guiding action off the hook guide 57. The hook guide 57 maintains the fatty side uppermost on the feed section 33 until such fatty side is picked up by the fingers 69 on the lower side of the chain 67. The intenstine is then torn away from the hook guide 57.

With the intenstine fatty side carried on the supporting rod 36 its lower side is cut longitudinally by a rotary knife 87 to release offal therefrom. The side portions of the lead end of the intestine are initially picked up and spread out by the forward base plate sections 39, the front edges 96 of which, as shown in FIGS. 1 and 4, are inclined downwardly and rearwardly. This pickup action is complemented by the lifting action of the water discharged from the orifices 52 at the forward end of the washing section 32 of the pipe member 31.

When the intestine reaches the middle base plate section 41 its side portions are moved to supported positions on the upper edges 49 of the vanes 47 whereby the under surface of the intestine is fully exposed to the action of the water discharged from the orifices 52 and the nozzles 77. This combined washing action on the exposed under surface of the intestine results in a release of a major portion of the offal particles adhering to the intestine so that what might be termed the heaviest washing action takes place over the intermediate base plate section 41, with the following wash action along the rear base plate section 42 being essentially a rinse or cleanup wash.

As a result of the hinged support of the intermediate section 41 on the end base plate sections 39 and 42 of the base plate 38, the hinged sections 41 are movable to upright positions laterally spaced from opposite sides of the pipe 31 so that the pipe 31, nozzles 77 and header 84 are fully accessible for convenient cleaning by a hosing opeartion.

In FIG. 3 there is diagrammatically illustrated the washing system that is associated with each of the combination washing and supporting units 12. Water under pressure from a suitable source is supplied through an inlet pipe 97 into a cylindrically shaped header 98 that is carried on the rear end frame structure 18. The water to the inlet 74 of the spray pipes 14 is supplied from a common feed line 99, provided with a control valve 101, and connected to the header 98. The inlet connections 54 and 56 to the pipe 31 have separate feed lines 103 and 104, respectively, connected with the header 98. Corresponding control valves 106 and 107 are connected in the feed lines 103 and 104, respectively. The header 84 for the spray nozzles 77 has a common supply line 108 equipped with a control valve 109 and connected to the header 98. The release nozzles 93 are connected to the header 98 through a feed line 111 provided with a control valve 112. It is seen, therefore, that the pressure and velocity of the jets from the pipes 14 are controlled independently of the jets from the pipe 31 and that the nozzles 77 have their own source of control to provide for a predetermined adjustment of the jet pressures.

All of the water for washing the intestine 88 is at room temperature. By using cold or room temperature water in the washing operation the fatty cells of the intestine 88 are maintained firm to facilitate the removal therefrom of all offal particles.

Although the invention has been described with respect to a preferred embodiment thereof it is to be understood that it is not to be so limited since changes and modifications can be made therein which are within the full intended scope of this invention as defined by the appended claims.

I claim:
1. Apparatus for cleaning animal intestines, comprising:
 (a) a horizontal pipe member having a plurality of transverse discharge openings in the upper side thereof for directing fluid upwardly and laterally therefrom,
 (b) a rod of a reduced diameter relative to said pipe member secured to said pipe member in a parallel spaced relation above said pipe member for supporting the central portion of a slit intestine,
 (c) intestine spreader assemblies attached to opposite sides of said pipe member for supporting the side portions of a slit intestine,
 (d) a conveyor mounted above and adjacent to the top side of said supporting rod and movable longitudinally of said supporting rod,
 (e) a plurality of nozzles arranged at transversely opposite sides of said pipe member for directing fluid upwardly and about the top side of the pipe member for intermixing with the fluid from said discharge openings in the zone about and to opposite sides of said supporting rod, (f) a plurality of downwardly extended projections on said conveyor extended downwardly along opposite sides of said rod member for engaging the central portion of a slit intestine supported on said rod whereby movement of the conveyor moves said intestine along the supporting rod and said spreader assemblies so that the bottom surface of the intestine is in a position to be cleaned by the fluid issuing from said discharge openings and nozzles, and (g) means for directing jets of fluid against the top surface of the intestine concurrently with the discharge of fluid from said discharge openings and nozzles.

2. An apparatus for cleaning animal intestines as defined in claim 1 wherein:

(a) each of said intestine spreader assemblies includes a base plate member extended longitudinally of the pipe member and inclined laterally and downwardly from a position below a diametric horizontal plane through the pipe member, (b) a plurality of upright vane members on a base plate member extended laterally of the pipe member with the top edges thereof inclined downwardly and outwardly from the inner side of the plate member and in a diverged relation therewith, (c) each base plate member having a central section and end sections, said central section formed with a plurality of notches in the inner side thereof corresponding in number to the nozzles located to one side of said pipe member, with a nozzle projected upwardly through a corresponding notch, and (d) means pivotally supporting said central section on said end sections for pivotal movement to an upright position spaced laterally from said one side of the pipe member to expose the nozzles for cleaning.

3. Apparatus for cleaning animal intestines, comprising:

(a) a frame structure, (b) intestine supporting means carried and extended longitudinally of said frame structure, including a fluid carrying member having a wash section and a feed section extended upwardly and forwardly from said wash section, (c) a vertically extended intestine slitting cutter unit supported on said frame structure below the front end of said wash section, (d) means secured to the front end of said frame structure and extended forwardly therefrom adjacent said feed section for releasably engaging the fatty side at the leading end of an intestine to guide said fatty side uppermost on the feed section as the intestine is moved toward the cutting unit, (e) means on said frame structure for moving an intestine slit by said cutter unit along said supporting means from the front end of said frame structure toward the rear end thereof, said intestine moving means being engageable with the fatty side of the intestine at the leading end thereof prior to the slitting of the opposite side of the intestine by the cutter unit to provide for the release of the intestine from said guide means and the support of the fatty side on said intestine supporting means, (f) means on said frame structure for directing streams of fluid against opposite side surfaces of the slit intestine being moved along said supporting means by said moving means, (g) guide means comprised of an upwardly open hook member, said hook member, when the leading end of an intestine is positioned about said feed section having a front terminal and insertable through the fatty side of the intestine at said leading end to guide said fatty side uppermost on the feed section as the intestine is moved toward said cutting unit, and (h) said leading end of the intestine being pulled free of said hook member, when the intestine is engaged by said moving means.

References Cited

UNITED STATES PATENTS

| | | | |
|---|---|---|---|
| 2,697,245 | 12/1954 | Clemens et al. | 17—43 |
| 2,726,421 | 12/1955 | Strickler | 17—43 |
| 2,791,800 | 5/1957 | Lindstrom | 17—43 |
| 3,290,722 | 12/1966 | Norrs | 17—43 |

LUCIE H. LAUDENSLAGER, Primary Examiner